2,709,501

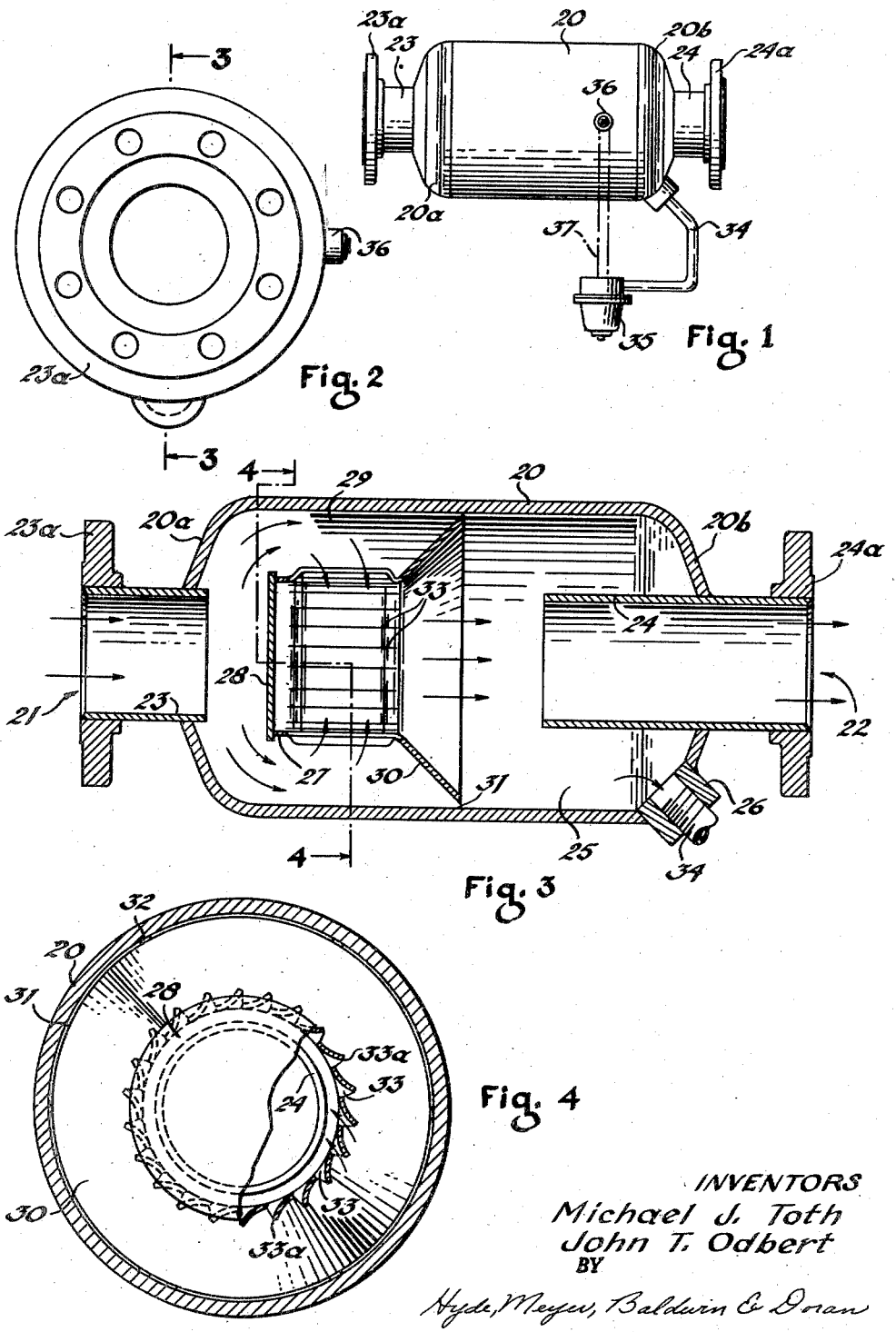

PURIFIER

Michael J. Toth, Cleveland, and John T. Odbert, Cleveland Heights, Ohio, assignors to The V. D. Anderson Company, Cleveland, Ohio, a corporation of Ohio Application January 6, 1953, Serial No. 329,902

4 Claims. (Cl. 183—80)

This invention relates to a novel and improved centrifugal separator of the non-rotative type for the purification of steam or other gaseous fluid currents by removal of entrained solid or liquid particles. While, as will be apparent to those skilled in the art, the invention may be utilized for the separation of objectionable substances from a wide variety of gaseous fluids it will be herein described as applicable to the removal of moisture from steam, and will be hereinafter occasionally referred to as a "purifier."

The principal object of the invention is to provide a two-stage separator of novel and efficient design which can be constructed substantially as simply and cheaply as previously known single stage separators.

A further object of the invention is to provide a two-stage separator in which the second stage is a conventional tuyère, but wherein a first stage is combined therewith in novel and improved manner, whereby the major portion of the entrained material is removed in said first stage, thereby greatly reducing the "load" on the tuyère, that is to say, the amount of material to be removed in the tuyère. Therefore, by means of an entirely novel arrangement of parts, the two stages in combination produce the improved results.

A further object of the invention is to provide a separator of the character described whereof the separation capacity is considerably increased as compared with previously used separators of comparable mechanical complexity and cost.

A further object of the invention is to provide a separator of the character described wherein separated liquid advancing towards its point of discharge from the separator need not pass through any gaseous currents in the separator.

Additional advantages of our invention will be apparent from a study of the following description in conjunction with the accompanying drawings, in which:

Fig. 1 is a side elevational view of a separator embodying our invention.

Fig. 2 is an end view, somewhat enlarged, as seen from the left end of Fig. 1.

Fig. 3 is a vertical sectional view taken on the line 3—3 of Fig. 2.

Fig. 4 is a sectional view taken on the line 4—4 of Fig. 3.

Separators or purifiers of the type now to be described have various uses including removal of oil from exhaust steam installations, removal of liquid condensate from compressed air lines, removal of line scale from gas or air lines, production of dry, clean steam, or removal of solid or liquid entrainment from vapor lines following evaporation. Solely for explanatory purposes we will describe on preferred embodiment of the invention in connection with the separation of entrained moisture droplets from a gaseous stream which is often steam, but will herein be termed merely "gas."

Referring now to the drawings of said preferred embodiment, we show a generally cylindrical housing 20 having end heads 20a and 20b, the end heads having respective inlet and outlet ports 21 and 22. Said pipes are respectively defined by tubular members 23 and 24, the latter member extending into the housing a substantial distance. Each such tubular member carries a connecting flange, 23a and 24a respectively, for connecting the separator in a steam line. The extension of the inner end of the outlet port pipe 24 into the housing provides an annular chamber 25 therearound which can drain through a coupling member 26, as will appear.

Within the cylindrical part of housing 20 is a tuyère having a generally cylindrical wall 27, closed at one end by a plate 28, and open at the other end. The wall 27 is coaxial with housing 20 and spaced radially inwardly therefrom to provide the annular space 29. The wall 27 carries an outwardly flared lip 30 of frusto-conical contour extending outwardly towards housing 20 but spaced therefrom by a narrow slit 31. The tuyère is supported by a plurality of peripherally spaced connectors 32 (Fig. 4) which may be welded connections or otherwise.

The cylindrical wall 27 has a series of slots 33 therein of louvered character, most conveniently formed by slitting the wall and outwardly deforming an edge 33a of each slot, the deformation of all such edges having a similarly oriented tangential deflection whereby a stream of gas entering the slots will have a vortical whirl imparted thereto.

From the coupling 26 a pipe 34 extends to a steam trap 35. A vent 36 may also have a line 37 extending to the trap 35 where needed to prevent vapor lock.

The operation of the purifier is as follows.

The entrainment-laden gas enters inlet port 21 and impinges against the bottom plate 28 of the tuyère which acts as a baffle separator, at the same time deflecting the gas and liquid laterally against the inner wall of housing 20. The separated liquid forms a film layer on said inner wall, the layer flowing forwardly (to the right in Fig. 3) to and through the annular slit 31 between lip 30 and housing 20. The slot must be narrow enough to cause the gaseous stream to seek passage elsewhere, namely through the tuyère slots 33, but wide enough to permit unhindered liquid passage for the liquid separated on end wall 28 and the inner surface of wall 20. Numerous tests have shown that a major portion of the liquid entering inlet port 21 flows through slot 31, the percentage being often higher than 80 per cent, and of course this reduces the work to be done by the tuyère. The situation most to be desired is one wherein liquid continuously flows through slot 31, but the presence of liquid continuously in the slot causes all of the partially purified gas to flow through tuyère slots 33.

The gas stream, including the suspended fine mist entrainment which has not been separated by baffle action, proceeds through the tuyère slots 33, being thereby directed tangentially to form a whirlpool or vortex within the tuyère. As a result of the louver design, all suspended entrainment is introduced at the outer periphery of the rotating gas inside the tuyère. The entrainment need not be thrown through a rotating wall of gas but merely needs to be held at the outer periphery of rotation while separation is being effected.

The entrainment is carried by the gas movement towards the conical lip 30 in a highly turbulent condition, thereby causing considerable interference between the individual droplets, and coalescing such droplets into larger and larger globules. Forward motion of the vortex (to the right in Fig. 3) causes the globules to flow outwardly over the inner frusto-conical wall of lip 30 towards its peripheral edge, at which zone it unites with the previously separated liquid flowing through slots 31. It thereafter continues to flow along the inner wall of housing 20, being there held and advanced by the still whirling gas. When the liquid reaches the vicinity of drain 26 it proceeds through pipe 34 and eventually through steam trap 35. The purified gas leaves by outlet port 22.

One of the distinguishingly novel features of our purifier is that once the liquid is separated at any point in its progress through the purifier it does not have to pass through a gas stream to leave the purifier, the separated liquid always traveling along an outer bounding surface after separation.

The separator just described is so efficient relative to its bulk, that it can be much smaller than previous separators of the same capacity. Since it is a pressure vessel, decrease in size means that a thinner wall will withstand the pressures encountered in service. For the same capacity, therefore, our purifier costs less than those previously available.

Our separator may be used in any desired position, either horizontally as shown in the drawings, or in any other orientation or inclination which is convenient or necessary in a particular adaptation. This should be kept in mind, and whenever the term "forwardly" is used herein it is to be understood as meaning in the direction of progress of the vapor or liquid towards their respective outlets from the casing.

What we claim is:

1. Purifying means of the character described for separating entrained matter from a gaseous stream comprising a casing of generally cylindrical character having an inlet port at one end and an outlet port at the other end, a tuyère of generally cylindrical form in said casing, said tuyère having a closed end substantially commensurate in diameter with the diameter of the tuyère and materially less than the inside diameter of the casing, said tuyère having an open end toward the discharge port end, the wall of said tuyère being spaced radially inwardly from the cylindrical wall of said casing, said wall of said tuyère having a series of spaced louvered slots therein running from adjacent said closed end to adjacent said open end whereby said gaseous stream enters the interior of said tuyère to form a gaseous vortex therein, said tuyère having an outwardly flared lip at its open end, said lip having inner and outer smooth uninterrupted frusto-conical surfaces, said lip extending toward but short of the inner surface of the cylindrical wall of said casing, the space between the outer periphery of said lip and the inner cylindrical surface of said casing being sufficiently restricted to cause the major portion of said gaseous stream to pass through said louvered slots, said smooth frusto-conical inner surface of said lip permitting said gaseous vortex, and any entrained matter therein, to trend outwardly to contact with the inner surface of the casing wall.

2. Purifying means as defined in claim 1 wherein connecting means is provided at spaced points around the periphery of said lip for attaching said lip to the inner surface of the casing wall, in spaced relation thereto.

3. Purifying means as defined in claim 1, wherein said louvered slots extend to the line of juncture of said lip with the cylindrical wall of said tuyère.

4. Purifying means as defined in claim 1 wherein said outlet port is bounded by a tubular member extending within the casing towards, but short of, said tuyère so as to define an annular chamber surrounding said outlet port, and a discharge opening in the housing wall surrounding said chamber for draining separated matter therethrough.

References Cited in the file of this patent

UNITED STATES PATENTS

| | | |
|---|---|---|
| 1,684,020 | Hawley | Sept. 11, 1928 |
| 2,117,718 | Hawley | May 17, 1938 |